United States Patent Office 3,684,693
Patented Aug. 15, 1972

3,684,693
SERIAL REFORMING WITH PLATINUM CATALYST IN FIRST STAGE AND IRIDIUM, RHODIUM, RUTHENIUM OR OSMIUM CATALYST IN SECOND STAGE
John H. Sinfelt, 296 Chaucer Drive, Berkeley Heights, N.J. 07922
No Drawing. Filed May 28, 1970, Ser. No. 41,613
Int. Cl. C10g 35/06, 39/00
U.S. Cl. 208—65
14 Claims

ABSTRACT OF THE DISCLOSURE

A conventional reforming catalyst, such as platinum-alumina, is used in the initial zone or reactors in a catalytic reforming process; the tail zone or reactors contains a noble metal from the first or second subgroups of Group VIII, designated $VIII_1$ and $VIII_2$, of the Periodic Table, supported on a suitable refractory carrier. In a preferred embodiment, the tail zone contains an iridium catalyst on a porous support such as alumna.

BACKGROUND OF THE INVENTION

Catalytic reforming is now a matter of record and commercial practice in this country. Basically, reforming involves the contacting of a naphtha fraction, either virgin, cracked, Fischer-Tropsch or any mixtures thereof, with a solid catalytic material. The catalyst is ordinarily a supported noble metal catalyst, such as platinum on alumina. Contacting takes place at elevated temperatures and pressures in the presence of added or recycled hydrogen. Hydrogen is essential since it suppresses the deactivation of the catalyst. The process itself produces substantial amounts of hydrogen, and in actuality this is the source of the hydrogen which is recycled to repress the deactivation of the catalyst; the deactivation of the catalyst is caused at least in part by carbon formation.

Reactions involved in catalytic reforming are: (1) dehydrogenation of naphthenes to the corresponding aromatic hydrocarbons such as methylcyclohexane dehydrogeneration to toluene; (2) isomerization of normal paraffins to branched-chain paraffins or isomerization of ring compounds, such as ethylcyclopentane to methylcyclohexane, which latter compound readily dehydrogenates to form toluene; (3) dehydrocyclization of paraffins to aromatics, e.g., n-heptane to toluene; and (4) hydrocracking of the higher boiling constituents.

Fixed bed catalytic reforming processes may be divided into three general classes: non-regenerative, semiregenerative and cyclic. The three processes differ most significantly in that the cyclic has an alternate or swing reactor which is so manifolded that it may replace any reactor within the system in order that the replaced reactor may be regenerated. The instant invention is intended to include all casses of reforming.

A great variety of catalysts for catalytically reforming a naphtha feed stream are known; perhaps the best known of these catalysts is platinum dispersed upon a highly purified alumina support such as one may obtain from aluminum alcoholate. Such a catalyst is described in detail in U.S. Patent 2,636,865 the disclosure of which is herein incorporated by reference. Other members of the platinum group such as palladium or rhodium may be utilized, but platinum is such preferred. The alumina support should have a high surface area, greater than 50 m.²/gm. It should also have acidic properties, and hence must be substantially free of alkaline impurities.

The platinum-on-alumina catalyst is outstanding for the selective conversion of naphthenes to aromatics, but is limited in its ability to convert paraffinic components in the feed. The problem in making the process more effective is thus a matter of increasing the activity in the tail reactors for the conversion of paraffins, preferably to aromatics, while simultaneously retaining the ability of platinum to convert naphthenes to aromatics in the initial zone.

SUMMARY OF THE INVENTION

According to this invention it has been unexpectedly discovered that if a catalytic reforming operation takes place in a train or series of three or four catalytic reforming reactors comprising substantially two separate catalytic reforming zones, with different catalysts, the combined rate of conversion of naphthenes and paraffins is increased. The initial zone which usually comprises the first, or first and second reactors, contains a conventional supported platinum group reforming catalyst such as platinum supported on alumina. The tail zone, which usually comprises the final two or three reactors but may be limited to a single reactor, contains a supported Group $VIII_1$ or Group $VIII_2$ metal catalyst, comprising a metal from the list including iridium, rhodium, ruthenium, or osmium on a suitable refractory support. The use of this catalytic reforming system, having both initial and tail zones, results in a product which has octane numbers significantly higher than that which can be obtained when the conventional platinum catalyst is employed throughout the system.

In the catalytic reforming process, the conversion of naphthenes to the corresponding aromatic hydrocarbons takes place for the most part in the initial zone of the train and even though considerable amounts of paraffins, both normal and iso, may be present in the feedstream to the first reaction zone, the predominant reaction in the initial zone is the conversion of naphthenes to aromatics.

In the tail zone paraffin conversion reactions predominate, either aromatization or hydrocracking. The aromatization reaction is extremely important if one is desirous of producing maximum yield of high octane number gasoline. Without effective conversion of paraffins to aromatics, octane improvement must be obtained by hydrocracking the paraffins to concentrate the aromatics already formed from naphthenes. This severely limits the yield of reformate obtainable when processing to very high octane numbers.

The traditional catalyst platinum-on-alumina, is especially effective for naphthene dehydrogenation. It has unexpectedly been found according to the instant invention that after the bulk of the naphthenes in the feedstream have been converted to aromatics, thus decreasing the naphthene content to a maximum level of about 15 wt. percent, the converted feedstream, if contacted with a supported Group $VIII_1$ or $VIII_2$ metallic catalyst, preferably an iridium catalyst, will yield a much higher octane number product than would have been obtained by further processing over the original platinum-alumina catalyst.

In more detail, the instant invention pertains to the catalytic reforming of a naphtha feedstream. A naphtha feedstream is a petroleum fraction boiling between about 80 and 450° F., preferably between 120 and 400° F. The feedstream generally contains about 15 to 75% by weight of paraffins, about 15 to 75% by weight of naphthenes and about 2 to 20 wt. percent of aromatics. Typically, when treated in a catalytic reforming train of 3 or 4 reactors, after passing through 2 of the reactors the feedstream would contain about 2 to 15 wt. percent naphthenes, the remainder consisting of aromatics and unconverted paraffins.

The catalyst utilized in the initial zone generally comprises a member of the platinum group, preferably platinum itself, deposited on an acidic high surface area support, e.g., 50 to 300 m.²/g. The support, which may be the same in all reactors, is an inorganic refractory oxide such as alumina or a mixed inorganic refractory oxide such as silica-alumina, silica-magnesia, or silica-alumina-magnesia. The support may in turn contain small amounts of halogen, boria, or additional components designed to impart acidity to the catalyst composite. Crystalline aluminosilicates may also be utilized. Preferred halogens which may be utilized would be chlorine or fluorine or a mixture of both. As a rule, the platinum metal comprises about 0.01 to 2.0% by weight of the catalyst; the major part of the catalyst is the support which usually varies between 96% by weight and 99.98% by weight of the total catalyst. Halogen, if utilized, comprises about 0.01 to 4.0 wt. percent of the catalyst, preferably 0.01 to 1.5 wt. percent.

The reactors to which the feedstream is passed after the naphthene content has been decreased to a level of about 15 wt. percent, preferably 10 wt. percent and most preferably about 5 wt. percent or lower contain a supported Group $VIII_1$ or $VIII_2$ noble metal catalyst, preferably iridium. According to the instant invention they will comprise the tail zone. This zone may comprise the second and third reactors in a three reactor train or the third and fourth reactors in a four reactor train. In a four reactor train, the Group $VIII_1$ or $VIII_2$ noble metal catalyst could also be employed in all reactors after the first, depending on the particular feedstock which is to be reformed and the efficiency of the first catalytic reforming reactor.

The supported Group $VIII_1$ or Group $VIII_2$ noble metal catalyst comprising iridium, rhodium, ruthenium or osmium, preferably iridium, supported on an inorganic refractory oxide, e.g., alumina, silica, or silica-alumina, may be prepared by several different methods all of which are intended to be within the scope of the instant invention.

A preferred method is illustrated by the preparation of an iridium catalyst with alumina as the support, but would be applicable to the other supported Group $VIII_1$ or $VIII_2$ metal catalysts. Alumina is impregnated with an aqueous solution of chloroiridic acid, after which it is dried at a temperature of about 220–250° F. The dried catalyst is then calcined at a temperature of about 400–600° F. in air or nitrogen. For the preparation of catalysts of other Group $VIII_1$ or $VIII_2$ noble metals, aqueous solutions of the chloride or acid chlorides may conveniently be used in the impregnation step.

In addition to alumina, silica, or silica-alumina, suitable supports for the Group $VIII_1$ or $VIII_2$ noble metal catalyst in the above technique include other refractory oxides such as magnesia, zirconia, and thoria, in addition to such mixed oxides as silica-magnesia or silica-alumina-magnesia. Crystalline aluminosilicates would also be useful supports for the catalyst.

These catalysts will generally contain about 0.01 to 5.0 wt. percent of Group $VIII_1$ or $VIII_2$ metal, preferably about 0.05 to 2.0 wt. percent, and most preferably about 0.1 to 1.0 wt. percent, the remainder of the catalyst comprising the support and possibly halogen.

Conditions within the several catalytic reformers may vary within relatively wide ranges. Pressure, for instance, may vary between 0 and 900 p.s.i.g., preferably between 15 and 600 p.s.i.g., and most preferably between 100 and 500 p.s.i.g. Temperatures within the catalytic reforming zones may also vary broadly. Generally, temperatures between 600 and 1050° F. are satisfactory; preferred temperatures are between 700 and 1000° F., and most preferred temperatures are between 780 and 980° F. Temperature and pressure will, of course, be a function of the particular feedstream utilized.

Hydrogen is circulated or recycled through the reactor zones at a rate of 0 to 15,000 standard cubic feet per barrel of liquid naphtha feed, preferably 1000 to 10,000 standard cubic feet, and most preferably 2000 to 6000 standard cubic feet per barrel.

The space velocity which is expressed as weight in pounds of feed charged per hour per lb. of catalyst, depends upon the activity level of the catalyst, the character of the feed stock and the desired octane number of the product. Ordinarily it may vary from about 0.2 w./hr./w. to 20 w./hr./w., preferably from about 0.5 w./hr./w. to about 10 w./hr./w. and most preferably from about 1 to 5 w./hr./w. based on the total catalyst in the system.

It is preferred to use the catalyst in the form of pellets or extrudates which are preferably $\frac{1}{16}$ to $\frac{1}{4}$ inch in diameter.

In a preferred embodiment of the instant invention a train of four catalytic reforming reactors is utilized. The third and fourth reactors contain a catalyst comprising iridium on an alumina support. The catalyst comprises about 0.1 to 1.0 wt. percent of iridium and the remainder alumina and halogen, the latter ranging from 0 to 2.0 wt. percent. The catalyst is prepared by impregnation of the alumina with an aqueous solution of chloroiridic acid. About 0.7 ml. of solution is used per gram of alumina. It is then dried at about 220–250° F. and subsequently calcined in air at 400–600° F. The finished catalyst is formed into pellets of about $\frac{1}{8}$ inch and charged to the reforming reactors. In the first two reactors there is a standard reforming catalyst which comprises about 0.6 wt. percent platinum-on-alumina, prepared by impregnation of alumina with chloroplatinic acid. The finished catalyst is used in the form of $\frac{1}{8}$ inch cylindrical pellets. The amount of catalyst charged to the first two reactors is about 25 to 75 wt. percent of the total catalyst employed in all the reactors. Feed stream is a naphtha cut boiling between about 120 and 400° F. which comprises about 15 to 75 wt. percent paraffins, about 15 to 75 wt. percent naphthenes, and about 2 to 20 wt. percent aromatics; weight hourly space velocity of naphtha feed is 0.5 to 10 pounds of feed per hour per pound of total catalyst in the system. Reactor temperatures and pressures are in the range of 700 to 1000° F. and 100 to 500 p.s.i.g., respectively. The hydrogen recycle gas rate is 1000 to 10,000 standard cubic feet per barrel of naphtha feed. The product issuing from the first two reactors contains about 2 to 15 wt. percent naphthenes, the remainder comprising paraffins, both normal and iso, and aromatics. After passage through the third and fourth reactors containing the iridium catalyst, the product is separated into two fractions, one containing $C_5$ and higher molecular weight hydrocarbons and the other $C_4$ and lower molecular weight hydrocarbons. The $C_5+$ fraction contains 60 to 80 wt. percent aromatics, or higher, with research clear octane numbers in the range of 90 to 105, or higher.

SPECIFIC EMBODIMENTS

Example 1

In this example a naphtha feed stream is treated by a standard, commercial catalytic reforming technique. The feed is a mixed Louisiana naphtha boiling in the range of 200 to 325° F. The constituents of the feedstream are as follows: 40% naphthenes, 45% paraffins, 15% aromatics (by weight). It is passed through a series of four catalytic reforming reactors. In each reactor there is a catalyst which comprises 0.6 wt. percent of platinum on alumina, prepared by impregnation of alumina with chloroplatinic acid, followed by drying and calcination in air at 1000° F. This is a conventional method of preparation of a platinum reforming catalyst. The catalyst is charged to the reactors in the form of $\frac{1}{8}$ inch cylindrical pellets. The surface area of the alumina support used in the catalyst is about 175 m.$^2$/gm. The weight hourly space velocity of the feed is 2 pounds per hour per pound of catalyst. Inlet reactor temperatures are maintained at 940° F., average pressure is 300 p.s.i.g. Hydrogen recycle is about 5000 standard cubic feet per barrel of naphtha feed. After passing through the four catalytic reforming reactors, a liquid product is obtained which has a research clear octane number of about 99.

Example 2

In this example the same feed stream is catalytically reformed under identical processing conditions. There is, however, one significant difference; the platinum-on-alumina catalyst in the third and fourth reactors is replaced by an iridium on alumina catalyst. The catalyst comprises about 0.5 wt. percent iridium, about 0.5% chlorine, and the remainder alumina. The catalyst is prepared by impregnation of alumina with an aqueous solution of chloroiridic acid, followed by drying and calcination in air at 500° F. The catalyst is used in the form of ⅛ inch cylindrical pellets.

The feedstream after passing over the platinum-on-alumina catalyst in the first two reactors has the following composition: 5 wt. percent naphthenes, 55 wt. percent aromatics and 40 wt. percent paraffins. After passing through the third and fourth reactors which contain the supported iridium catalyst, the liquid product recovered has a research clear octane number of 103 or higher.

When comparing the octane rating of the product obtained from the process of Example 2 with that of Example 1 a difference of at least 4 octane numbers is noted. This difference is attributable to the improved ability of the iridium catalyst for catalyzing the reactions responsible for octane number improvement beyond the point where the naphthenes have been essentially completely converted to aromatics.

Example 3

In this example the exact conditions and proportions of Example 2 are utilized except that the iridium catalyst is replaced by a rhodium catalyst, which is supported on alumina. All other conditions are identical; the recovered product has a research clear octane number of 102 or higher. The catalyst would be prepared by the same procedure used in Example 2 except that rhodium trichloride would be used in place of chloroiridic acid for the impregnation step.

Example 4

In this example the exact conditions and proportions of Example 2 are utilized except that in the third and fourth reactors a catalyst which comprises ruthenium on alumina is utilized in place of the iridium on alumina; the metal content, and also the alumina support, are the same as in Example 2. A product is recovered which has a research clear octane number of 100 or higher.

The catalyst is prepared by the procedure of Example 2 except that ruthenium trichloride is used in place of chloroiridic acid for the impregnation step.

What is claimed is:

1. A process for catalytically reforming a hydrocarbon feed stream boiling between about 80 and 450° F. and containing about 15 to 75 wt. percent naphthenes, about 15 to 75 wt. percent paraffins and the remainder aromatics, which comprises passing said feed stream and a hydrogen-rich gas at a temperature of about 600 to 1050° F., a pressure of about 15 to 600 p.s.i.g., at a space velocity of about 0.5 to 10 w./hr./w., into a catalytic reforming zone, said zone containing a catalyst comprising platinum on an inorganic oxide support whereby the naphthene content is decreased to a maximum level of about 15 wt. percent, passing the effluent from said first zone into a second catalyst reforming zone, said second zone containing a catalyst consisting essentially of a metal selected from the group consisting of iridium, rhodium, ruthenium, and osmium on an inorganic oxide support, and recovering a product of high octane number.

2. The process of claim 1 wherein the first reforming zone comprises the first, or first and second reactors of a larger series.

3. The process of claim 1 wherein the second reforming zone comprises the final two or three reactors of a larger series.

4. The process of claim 1 wherein the naphthene content is decreased to a maximum level of 10 wt. percent naphthenes in the said first reforming zone.

5. The process of claim 4, wherein the naphthene content is decreased to 5 wt. percent.

6. The process of claim 1 wherein the catalyst employed in the second reforming zone consists essentially of iridium on an alumina support.

7. The process of claim 6 wherein the catalyst contains from about 0.1 to 1.0 wt. percent iridium, and from about 0 to 2.0 wt. percent halogen.

8. The process of claim 1 wherein the catalyst employed in the first reforming zone consists essentially of platinum on an alumina support.

9. The process of claim 8 wherein the catalyst contains from about 0.01 to 2.0 wt. percent platinum, and from about 0.01 to 4.0 wt. percent halogen.

10. The process of claim 9 wherein the catalyst contains from about 0.01 to 1.5 wt. percent halogen.

11. A process for catalytically reforming a hydrocarbon feed stream boiling between about 80 and 450° F. and containing about 15 to 75 weight percent naphthenes, about 15 to 75 weight percent paraffins and the remainder aromatics, which comprises passing said feed stream and a hydrogen-rich gas at a temperature of about 600 to 1050° F., a pressure of about 15 to 600 p.s.i.g., at a space velocity of about 0.5 to 10 w./hour/w., into a catalytic reforming zone, said zone containing a catalyst comprising platinum and halogen on an alumina support whereby the naphthene content is decreased to a maximum level of about 15 weight percent, passing the effluent from said first zone into a second catalyst reforming zone, said second zone containing a catalyst consisting essentially of halogen and iridium on an alumina support, and recovering a product of high octane number.

12. The process of claim 11 wherein said halogen on each of said catalysts is chlorine.

13. The process of claim 7 wherein said platinum comprising catalyst contains from 0.01 to 4.0 weight percent halogen.

14. The process of claim 9 wherein the halogen on each of said catalysts is chlorine.

References Cited

UNITED STATES PATENTS

| | | | | |
|---|---|---|---|---|
| 2,848,377 | 8/1958 | Webb | | 208—138 |
| 3,436,335 | 4/1969 | Maziuk | | 208—65 |
| 3,554,902 | 1/1971 | Buss | | 208—138 |

HERBERT LEVINE, Primary Examiner

U.S. Cl. X.R.

208—138